(No Model.)

J. J. RICKETTS.
COUPLING FOR WATER CLOSETS.

No. 434,117.  Patented Aug. 12, 1890.

Witnesses:
J. A. Cooke
Robt. D. Totten

Inventor:
James J. Ricketts
By James J. Kay
Attorneys

UNITED STATES PATENT OFFICE.

JAMES J. RICKETTS, OF PITTSBURG, PENNSYLVANIA.

COUPLING FOR WATER-CLOSETS.

SPECIFICATION forming part of Letters Patent No. 434,117, dated August 12, 1890.

Original application filed July 30, 1889, Serial No. 319,156. Divided and this application filed April 7, 1890. Serial No. 346,831.

(No model.)

*To all whom it may concern:*

Be it known that I, JAMES J. RICKETTS, a resident of Pittsburg, in the county of Allegheny and State of Pennsylvania, have invented a new and useful Improvement in Couplings for Water-Closets; and I do hereby declare the following to be a full, clear, and exact description thereof.

My invention relates to couplings for water-closets, and is in part a divisional application for improvements shown in application for patent filed by me July 30, 1889, Serial No. 319,156, its object being to provide a coupling to connect the supply-pipe with what is commonly termed the "horn" of the closet, which will not only be flexible, so as to yield to any displacement on the part of said supply-pipe or horn, but one which will insure a water-tight connection between them, the peculiar advantage of said connection being that its efficiency is increased when the water is flowing.

To these ends my invention consists, generally stated, in a coupling for water-closets comprising a flexible elbow or like joint having an enlarged portion at one end thereof corresponding to the shape of the horn and adapted to engage with the horn of the closet, and a portion of the elbow extending within said enlargement and adapted to seat itself in the horn.

It also consists in providing a flexible elbow with a flange adapted to fit in an annular seat formed in the sleeve connecting the elbow with the supply-pipe, as hereinafter more particularly described and claimed.

To enable others skilled in the art to make and use my invention, I will describe the same more fully, referring to the accompanying drawings, in which—

Figure 1:
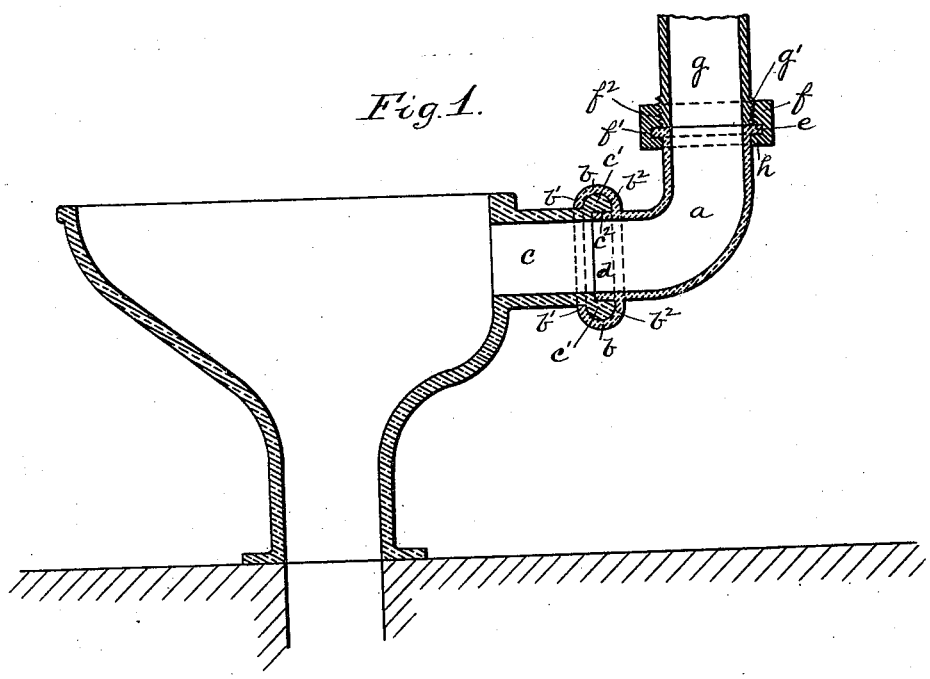
Figure 2:
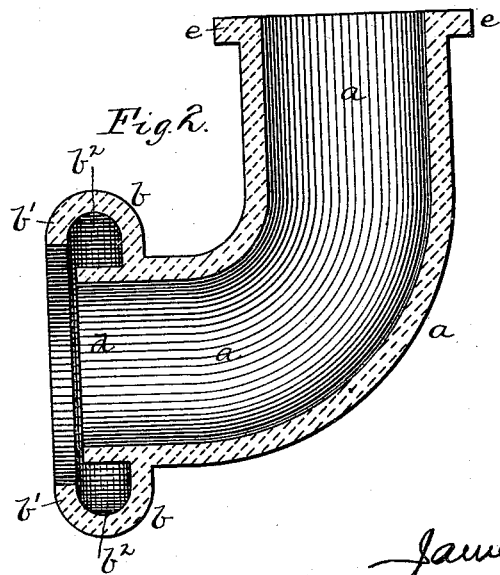

Figure 1 is a sectional view of my improved coupling, and Fig. 2 is a sectional view of the elbow.

Like letters indicate like parts in both figures.

The elbow $a$ is made of flexible water-tight material—such as india-rubber—and of sufficient strength and thickness to sustain the strain to which it may be subjected. The elbow $a$ is formed with the enlargement or bulb $b$ therein, having the contracted mouth $b'$, and so forming the annular channel $b^2$, the bulb corresponding substantially in shape to and being adapted to be expanded around the bead $c'$ of the horn $c$ of the closet. Extending within the enlargement $b$ is the annular neck $d$, of the same diameter as the elbow, and adapted to fit within the mouth of the horn and seat itself against the inner part thereof, the annular seat $c^2$ being preferably formed in the horn $c$, so as to provide for the use of an elbow or coupling of the same internal diameter as the horn. A flange $e$ is formed on the other end of the elbow $a$, adapted when in position to be held securely within the annular seat or recess $f'$, formed in the sleeve $f$, which connects the supply-pipe $g$ with the elbow $a$. The annular seat or recess $f'$ extends into the body of said sleeve $f$ beyond the interior threaded face $f^2$, while the shoulder $h$ extends in beyond said threaded face, thereby forming a secure support for the rubber flange $e$ of the elbow. The threaded face $f^2$ of the sleeve $f$ engages with the threaded portion $g'$ of the supply-pipe $g$, thereby forming a water-tight connection between said pipe and elbow $a$. This annular recess $f'$ in the sleeve provides for the employment of a rubber elbow of the same internal diameter as the pipe or nipple connected to the sleeve, a matter of great importance, as the water in flowing from the tank to the bowl encounters no obstructions, and therefore its velocity is not checked. It is evident that to obtain sufficient strength in the elbow it must be made sufficiently thick and that the flange must extend out beyond the body far enough to prevent its being drawn out of the sleeve. By forming the recess for the flange in the sleeve the flange is securely held, while the sleeve is adapted to engage with the ordinary threaded pipe, and when the pipe enters the sleeve it seats itself against the flange back from the edge of the flange, a much more secure joint being thus obtained.

The elasticity of the rubber flange $e$ permits of its ready insertion within the annular recess $f'$, as it is apparent that said flange must be slightly bent before it can be made to enter said recess; but when in position it will spring back to its normal shape. The effect produced by the elasticity of the flange $e$, together with the recess $f'$ and the shoulder $h$, is to strengthen the connection with the sleeve $f$ and form a water-tight joint. The same principle is involved in securing the enlargement $b$ to the horn $c$, first the expansion of said enlargement permitting its adjustment to the horn $c$, and it then contracts around said horn, serving to form a tight connection. The neck $d$ adds to the strength of this connection by fitting against the interior face of the horn and in the seat $c^2$ thereof, and the peculiar effect of said neck $d$ being that as the water flows through the coupling from the supply-pipe $g$ the neck $d$ is forced against the interior walls of the horn, so preventing the escape of any of the water through leakage around said neck or between the horn and the enlargement.

A coupling of the nature described not only provides a very close water-tight connection at both ends thereof, but one which will yield to any displacement of the closet, and so prevent the breaking of the horn, as was often the case where a rigid coupling was employed.

What I claim as my invention, and desire to secure by Letters Patent, is—

1. In a coupling for water-closets, the combination, with the horn thereof having a bead thereon, of a rubber or like flexible elbow having an enlargement or bulb at one end provided with a contracted mouth and adapted to fit around the horn and form a tight joint therewith, substantially as and for the purposes set forth.

2. In a coupling for water-closets, the combination, with the horn thereof having a bead thereon, of a rubber or like flexible elbow having an enlargement at one end thereof provided with a contracted mouth and adapted to fit around the horn, and a neck extending within said enlargement and adapted to seat itself against the interior wall of the horn, substantially as and for the purposes set forth.

3. In a coupling for water-closets, the combination, with the horn thereof having an annular seat therein, of a flexible elbow having an enlargement at one end thereof adapted to fit around said horn, and a neck extending within said enlargement and arranged to enter the seat formed for it in said horn, substantially as and for the purposes set forth.

4. In a coupling for water-closets, the combination, with a rubber or like flexible elbow having a flange formed on the end thereof, of a coupling-sleeve having a threaded interior and an annular recess below and of greater diameter than the threaded interior and adapted to receive the flange of the rubber elbow, substantially as and for the purposes set forth.

In testimony whereof I, the said JAMES J. RICKETTS, have hereunto set my hand.

JAMES J. RICKETTS.

Witnesses:
J. N. COOKE,
ROBT. D. TOTTEN.